US008724753B2

(12) United States Patent
Demessie et al.

(10) Patent No.: US 8,724,753 B2
(45) Date of Patent: May 13, 2014

(54) SPECTRUM SENSOR FOR COGNITIVE WIRELESS COMMUNICATION AND METHOD FOR COGNITIVE WIRELESS COMMUNICATION

(75) Inventors: Yohannes Alemseged Demessie, Tokyo (JP); Chen Sun, Tokyo (JP); Ha Nguyen Tran, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 179 days.

(21) Appl. No.: 13/386,688

(22) PCT Filed: Jul. 21, 2010

(86) PCT No.: PCT/JP2010/004672
§ 371 (c)(1),
(2), (4) Date: Feb. 15, 2012

(87) PCT Pub. No.: WO2011/010458
PCT Pub. Date: Jan. 27, 2011

(65) Prior Publication Data
US 2012/0140793 A1 Jun. 7, 2012

(30) Foreign Application Priority Data
Jul. 24, 2009 (JP) ................................. 2009-173618

(51) Int. Cl.
*H04B 7/10* (2006.01)

(52) U.S. Cl.
USPC ........... 375/347; 375/130; 375/135; 375/295; 375/316; 375/346

(58) Field of Classification Search
CPC ... H04B 1/7163; H04B 17/004; H04W 16/14; H04W 24/00; H04W 24/08; H04W 28/04; H04W 72/085; H04W 28/06; H04W 28/18; H04W 28/22; H04W 52/0229; H04W 88/06; H04L 1/1664; H04L 1/0001; H04L 27/0012

USPC ......... 375/130, 132, 135, 136, 146, 147, 150, 375/219, 262, 167, 271, 295, 299, 316, 340, 375/342, 346, 347, 350

See application file for complete search history.

(56) References Cited

U.S. PATENT DOCUMENTS

| 6,473,607 B1 * | 10/2002 | Shohara et al. ............. 455/343.1 |
| 7,903,718 B2 * | 3/2011 | Chu et al. ....................... 375/132 |

(Continued)

FOREIGN PATENT DOCUMENTS

| JP | 2007-060410 | 3/2007 |
| JP | 2007-088940 | 4/2007 |

(Continued)

OTHER PUBLICATIONS

English translation of International Search Report for corresponding International Application No. PCT/JP2010/004672, mailed Oct. 19, 2010.

(Continued)

*Primary Examiner* — Hirdepal Singh
(74) *Attorney, Agent, or Firm* — Myers Wolin, LLC

(57) ABSTRACT

Provided is a spectrum sensor for cognitive wireless communication whereby it is possible to improve communication efficiency. In a cognitive wireless communication system, a spectrum sensor senses spectra in multiple frequency bands. A spectrum sensor is configured to be able to operate in one operation mode selected from among a spectrum sensing mode for sensing spectra, and a communication mode for communicating with a wireless communication device. Further, the spectrum sensor is provided with a controller for controlling the operation mode. The controller switches between the above-mentioned operation modes during the symbol period of an ultra-wideband physical layer (UWB PHY).

4 Claims, 2 Drawing Sheets

(56) References Cited

U.S. PATENT DOCUMENTS

| | | | |
|---|---|---|---|
| 8,184,653 B2* | 5/2012 | Dain et al. | 370/431 |
| 8,326,309 B2* | 12/2012 | Mody et al. | 455/452.1 |
| 8,463,229 B2* | 6/2013 | Suumaki et al. | 455/343.4 |
| 8,498,237 B2* | 7/2013 | Corson et al. | 370/319 |
| 2007/0133387 A1 | 6/2007 | Arslan | |
| 2007/0153877 A1* | 7/2007 | Siwiak | 375/146 |
| 2008/0089279 A1* | 4/2008 | Hu et al. | 370/329 |
| 2008/0212650 A1 | 9/2008 | Hwang | |
| 2008/0225789 A1* | 9/2008 | Kim et al. | 370/329 |
| 2009/0135744 A1* | 5/2009 | Chaudhri et al. | 370/278 |
| 2009/0147741 A1* | 6/2009 | Hu | 370/329 |
| 2010/0227622 A1* | 9/2010 | Mody et al. | 455/452.1 |

FOREIGN PATENT DOCUMENTS

| | | |
|---|---|---|
| JP | 2007060410 A | 8/2007 |
| JP | 2008-079280 | 4/2008 |
| JP | 2011-023849 | 2/2011 |

OTHER PUBLICATIONS

Extended European Search Report for European Application No. 10802079.3 mailed Oct. 9, 2013.

State Intellectual Property Office of the People's Republic of China Office Action for Chinese Application No. 201080032617.1 issued Oct. 10, 2013.

* cited by examiner

US 8,724,753 B2

SPECTRUM SENSOR FOR COGNITIVE WIRELESS COMMUNICATION AND METHOD FOR COGNITIVE WIRELESS COMMUNICATION

CROSS REFERENCE TO RELATED APPLICATIONS

The present disclosure is a national phase filing under 35 U.S.C. §371 of International Patent Application No. PCT/JP2010/004672 filed on Jul. 21, 2010, which claims priority to Japanese Patent Application No. 2009-173618 filed on Jul. 24, 2009, the disclosures of each of which are expressly incorporated herein by reference in their entireties.

TECHNICAL FIELD

The present invention relates to a spectrum sensor for cognitive wireless communication and a method for cognitive wireless communication, and particularly to a spectrum sensor for cognitive wireless communication and a method for cognitive wireless communication capable of detecting an energy by use of an ultra-wideband physical layer (UWB PHY) conforming to the IEEE802.15.4a standard.

BACKGROUND ART

Wireless communication is made between a plurality of wireless communication devices. In such wireless communication, a demand for spectrum has increased. In order to address a problem of lacking spectra, there has been proposed a technique for dynamic spectrum access (DSA). An exemplary technique for dynamic spectrum access is cognitive radio (see Patent Document 1, for example).

In a cognitive wireless communication system, at first, a spectrum sensor scans a wireless frequency environment. A result of the spectrum sensing is transferred, as an output, to a cognitive engine (CE) which is also called the brain of the cognitive wireless communication system. Then, the cognitive engine (CE) analyzes sensing information. A frequency band (frequency opportunity) available in the cognitive wireless communication is specified based on the analysis.

In the cognitive wireless communication system, a local analysis may be preliminarily made in the spectrum sensor, and in this case, obtained information is transferred to the cognitive engine (CE) to be used for a final determination.

As described above, in the cognitive wireless communication system, the sensing information is obtained as a result of the spectrum sensing thereby to enable the cognitive wireless communication.

Herein, if spectra can be rapidly sensed (or the obtained sensing information can be rapidly exchanged), the obtained spectrum opportunity is expected to be able to be immediately used. However, on the other hand, in the cognitive wireless communication system, reliability of the spectrum sensing needs to be enhanced for protecting a licensed wireless communication service. In other words, if reliable spectrum sensing can be rapidly performed within a limited period of time, a communication efficiency of the cognitive wireless communication can be expected to be enhanced.

The present inventors have invented a spectrum sensor having both a communication function (transmission/reception function) and a spectrum sensing function (which will be called dual spectrum sensor below) (Non-Patent Document 1). However, in such a dual spectrum sensor, with one output, the communication function needs to be stopped for sensing spectra to save a time for sensing spectra.

From the above, in the cognitive wireless communication, it was not easy to meet both reliability of the spectrum sensing and rapid spectrum sensing (or rapid communication after the spectrum sensing). When a time for sensing spectra is previously defined depending on the standard specification and when a time for the communication function cannot be secured while a time for communication is previously defined depending on the standard specification, a time for sensing spectra cannot be secured. Thus, the communication efficiency of the spectrum cognitive wireless communication was difficult to further enhance.

PRIOR ART DOCUMENT

Patent Document

Patent Document 1: Japanese Patent Application Laid-Open No. 2007-088940

Non-Patent Document

Non-Patent Document 1: Patent Application 2009-165297 (unpublished)

SUMMARY OF INVENTION

Technical Problem

It is therefore an object of the present invention to provide a spectrum sensor for cognitive wireless communication capable of enhancing a communication efficiency and a method for wireless communication using the spectrum sensor.

Solution to Problem

The present invention basically relates to a spectrum sensor for cognitive wireless communication. The spectrum sensor is directed for sensing spectra in multiple frequency bands in a cognitive wireless communication system. The cognitive wireless communication system includes a wireless communication device capable of making cognitive wireless communication.

The spectrum sensor according to the present invention is configured to be operable in one operation mode selected from the operation modes including a spectrum sensing mode for sensing spectra and a communication mode for communicating with a wireless communication device. Further, the spectrum sensor includes a controller for controlling the operation mode. The controller switches the operation modes during a symbol period of an ultra-wideband physical layer (UWB PHY). Thus, according to the present invention, a time needed for the spectrum sensing function can be secured and a time needed for the communication function can be secured, thereby enhancing the communication efficiency. In other words, the spectrum sensing and the communication can be conducted in parallel during the symbol period.

According to another aspect of the present invention, the spectrum sensor for cognitive wireless communication includes a first integrator and a second integrator into which externally-input wireless signals are input in parallel, a code inverter for inverting an output value of the second integrator, a first adder for adding an output value of the first integrator and the output value of the second integrator inverted by the code inverter, a first determination device connected to the first adder in series, a second adder for adding the output of the first integrator and the output value of the second integration value not inverted by the code inverter, and a second determination device connected to the second adder in series.

The controller causes the first determination device to make a determination using the output value of the first adder when the operation mode is the communication mode, and causes the second determination device to make a determination using the output value of the second adder when the operation mode is the spectrum sensing mode. Thereby, the first integrator and the second integrator can be utilized in both operation modes. In other words, the parts are shared so that the spectrum sensor can be downsized and power consumption can be reduced. Further, the spectrum sensor has the two output units (the first determination device and the second determination device) to enable the outputs in parallel. In other words, an output in the communication mode (communication signal) and an output in the spectrum sensing mode (sensing signal) can be separated and output. Thus, also when the sensing signal is analyzed and calculated, an influence on communication modules (devices or function blocks used in the communication mode) can be eliminated.

According to another aspect of the present invention, the controller uses an integration interval selector and a delay selector to change an integration interval and a start point thereof of the integrator according to the operation mode. Thus, the operation according to the operation mode can be accurately performed.

According to still another aspect of the present invention, the spectrum sensor for cognitive wireless communication includes a first antenna for receiving a wireless signal from the outside, bandpass filters provided between the first antenna, and the first integrator and the second integrator, a group of antennas including multiple second antennas for receiving wireless signals from the outside, and a filter bank configured of a plurality of bandpass filters provided between the group of antennas, and the first integrator and the second integrator.

The controller switches the operation modes so that a wireless signal from the outside is input into both the first integrator and the second integrator via the bandpass filters or the filter bank. Thereby, the parts can be accurately shared.

According to still another aspect of the present invention, the symbol period includes a period in which communication is made and a period in which communication is not made. The controller is configured to switch the operation mode to the spectrum sensing mode in the period in which communication is not made. Thus, the period in which communication is not made (such as guard interval period $T_{G1}$) can be utilized thereby to accurately sense spectra.

Still another aspect of the present invention relates to a method for cognitive wireless communication for making cognitive wireless communication in the cognitive wireless communication system. The method includes at least a wireless communication device capable of making cognitive wireless communication and a spectrum sensor for cognitive wireless communication for sensing spectra in multiple frequency bands. The spectrum sensor is configured to be operable in one operation mode selected from the operation modes including the sensing mode for sensing spectra and the transmission/reception mode for transmitting and receiving a control signal to and from the wireless communication device.

In the cognitive wireless communication method, the operation mode is switched during a symbol period of an ultra-wideband physical layer (UWB PHY). That is, similar effects to the above effects can be obtained also in this aspect.

Advantageous Effects of Invention

According to the present invention, a communication efficiency of a cognitive wireless communication system can be enhanced.

DESCRIPTION OF EMBODIMENTS

Figure 1:
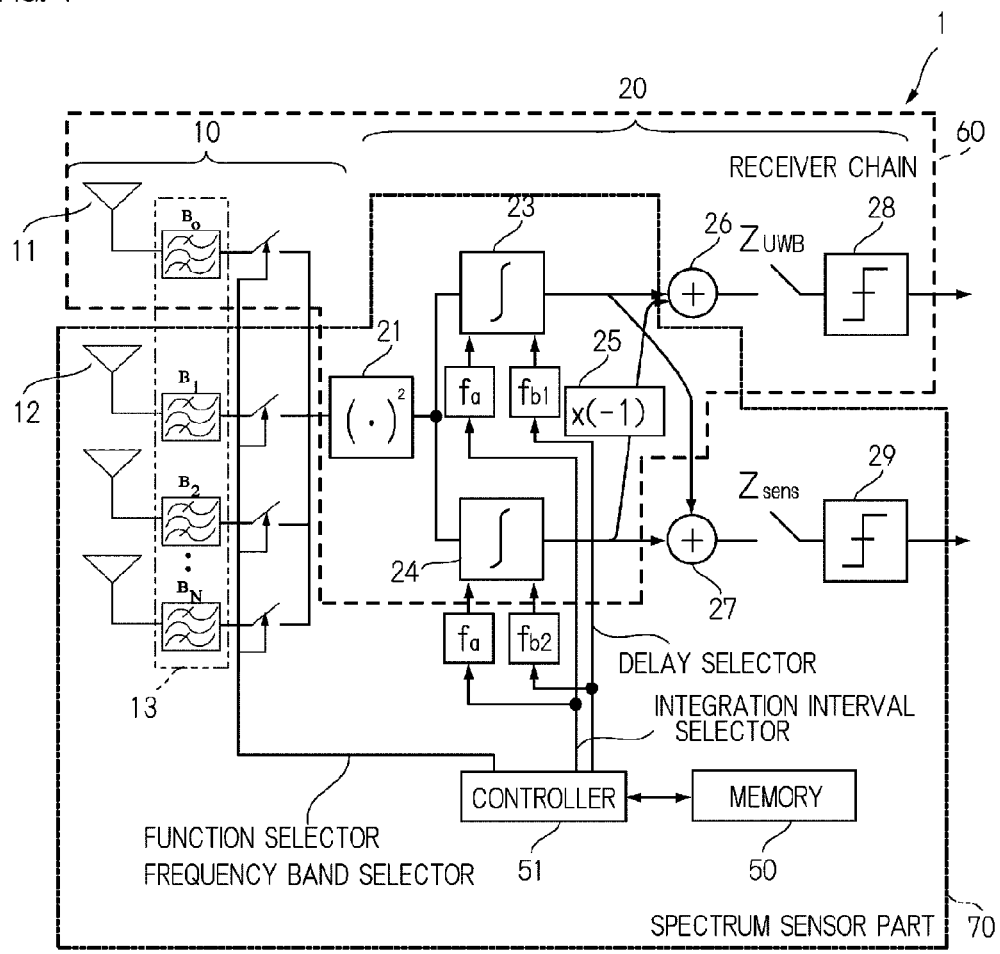
FIG. 1 is a block diagram schematically showing a structure of a spectrum sensor for cognitive wireless communication according to one embodiment of the present invention.

An embodiment for embodying the present invention will be described with reference to the drawings. However, the embodiment to be described is only exemplary and can be modified as needed within an apparent range for those skilled in the art.

A spectrum sensor for cognitive wireless communication according to one embodiment of the present invention is one logical element configuring a cognitive wireless communication system. The spectrum sensor is directed for sensing spectra needed for making cognitive wireless communication in the cognitive wireless communication system. The spectrum sensing is to scan a frequency environment capable of being used for wireless communication such as cognitive wireless communication and thereby to obtain information (sensing information) capable of analyzing a usage situation of the spectra.

According to the present embodiment, the spectrum sensor (dual spectrum sensor) is configured to be able to receive sensing control information from other logical elements (cognitive engine (CE) and data archive (DA)) configuring the cognitive wireless communication system, to receive sensing information from other spectrum sensor and to transmit the sensing information or the sensing control information to other components. In other words, the spectrum sensor according to the present embodiment is configured to be able to achieve both the spectrum sensing function and the communication function (transmission/reception function) (that is, to be able to serve dual purpose).

Further, according to the present embodiment, the spectrum sensor is characterized by sensing spectra via a physical layer (PHY) conforming to the IEEE802.15.4a, and has a hybrid structure adopting two modulation systems such as BPM and BPSK. Thereby, the spectrum sensor 1 can sense spectra and can make communication in parallel with the spectrum sensing. The spectrum sensor may not necessarily conform to the IEEE802.15.4a standard, but the present embodiment is applied to the wireless communication system of low duty cycle (LDC) type so that the spectrum sensor according to the present embodiment is more effective.

Hybrid modulation can be performed in an UWB physical layer (UWB PHY) of the spectrum sensor. The hybrid modulation is BPM-BPSK modulation including a well-known binary phase shift keying modulation system (BPSK) and a binary pulse position modulation system (BPK).

In the BPM-BPSK modulation, a symbol of the UWB PHY is assumed as a carrier of 2-bit information. One bit of the two bits is used for determining a burst at a pulse position and the other is additional and is used for modulating a phase (polarity) of the same burst as the burst. The modulation system is adopted so that a remarkably simple and noncoherent wireless receiver structure can be used (supported). An exemplary noncoherent wireless receiver structure may include an impulse radio (IR) type ultra-wideband (UWB). The modulation system can be used to support a coherent wireless receiver.

In the present embodiment, the spectrum sensor assumes the IR-UWB as base. Thereby, the spectrum sensor according to the present embodiment can minimize power consumption and can lower complexity. Thus, small-sized spectrum sensors can be industrially mass-produced.

The spectrum sensor according to the present embodiment is configured to be able to detect a UWB signal (or LDC signal) conforming to the IEEE802.15.4a standard with the IR-UWB as base. According to the present embodiment, IR is selected along with the energy detection in the wireless transmitter/receiver of the spectrum sensor, thereby making it possible to share (reuse) the components for the communication function and the components for the spectrum sensing function in the spectrum sensor. Then, the wireless communication system using IR-UWB (IR-UWB system) has an advantage in that excellently robust performance can be obtained due to a property of a remarkably wide frequency area even in a severe multipath environment or interference environment.

A structure of the spectrum sensor according to the present embodiment will be described below.

FIG. 1 is a block diagram schematically showing the structure of the spectrum sensor for cognitive wireless communication according to one embodiment of the present invention. Specifically, a plurality of function blocks configuring the spectrum sensor are shown in FIG. 1.

As shown in FIG. 1, the spectrum sensor 1 includes a reception unit 10, a detector 20, a memory 50 and a controller 51. The spectrum sensor 1 is configured to be able to switch the operation mode between the transmission/reception mode and the sensing mode, and is set in the transmission/reception mode in the default state. The transmission/reception mode is directed for transmitting and receiving a control signal or sensing information to and from other wireless communication device. The sensing mode is directed for sensing spectra and obtaining sensing information.

The reception unit 10 is arranged at the front end of the spectrum sensor 1 or the device mounting the spectrum sensor 1 thereon, and includes a first antenna 11, second antennas 12 and a group of filters 13. The antennas 11, 12 are directed for receiving a control signal from a wireless communication device or sensing spectra. The group of filters 13 includes as many bandpass filters (BPF) $B_0, B_1, B_2, \ldots, B_N$ as total first antennas 11 and second antennas 12. Each bandpass filter is connected to an antenna.

The bandpass filter $B_0$ and the first antenna 11 connected thereto are provided for serving the reception function of the communication function of the spectrum sensor 1. The first antenna 11, the bandpass filter $B_0$ and part of the detector 20 configure a receiver chain 60. A frequency band in which the bandpass filter $B_0$ can pass is a communication frequency band, and in the present embodiment, a UWB frequency band. The frequency band in which the bandpass filter $B_0$ can pass is specifically a sub-giga hertz band (250 GHz to 750 GHz), a low frequency band (3.1 GHz to 5 GHz), a high frequency band (6 GHz to 10.6 GHz), or a combination thereof.

On the other hand, the remaining bandpass filters $B_1, B_2, \ldots, B_N$ and the group of antennas (multiple second antennas 12) connected thereto are provided for sensing spectra. Each of the bandpass filters $B_1, B_2, \ldots, B_N$ is provided between one antenna and the detector 20 and is connected to the detector 20. The bandpass filters are a filter bank in which the bandpass filters can detect spectra in mutually different frequency bands and are provided to cover all the areas in the multiplexed frequency bands received by the corresponding antennas (second antennas). The filter bank conforms to the IEEE802.15.4a standard in the present embodiment. In other words, each bandpass filter configuring the filter bank is tuned to be able to receive a signal in a specific frequency band.

In the present embodiment, a part 70 configured of the second antennas 12, the bandpass filters $B_1, B_2, \ldots, B_N$ and part of the detector 20 can sense spectra. Thus, the part 70 will be assumed as spectrum sensor part in the present specification. The controller 51 can control connection/disconnection thereby to sense a spectrum in a specific frequency area, and thus a sensing period in the frequency area can be secured long.

The connection/disconnection between each bandpass filter $B_0, B_1, B_2, \ldots, B_N$ and the detector 20 is controlled by the controller 51. Thereby, for example, the frequency band to be sensed can be flexibly adjusted (that is, switched) also for sensing a multiplexed spectrum. Such a filter bank can be provided to reduce the number of challenges of sensing spectra as compared with a front end analog filter for adaptive wideband.

The detector 20 is a function block for detecting a spectrum by the spectrum sensor 1. Specifically, the detector 20 is a hardware provided for both spectrum sensing and communication (transmission/reception). In other words, the detector 20 is shared between the receiver chain 60 and the spectrum sensor part 70.

In the present embodiment, the detection of spectrum by the detector 20 is performed by energy detection. The energy detection technique is typical of the wireless signaling technique such as UWB. The energy detection can maintain the complexity low at the next best degree when a wireless signal is detected. For the spectrum sensing by the spectrum sensor part 70, communication is made by use of the UWB signaling, for example. The UWB system uses an unlicensed spectrum, and thus the internal sensor and the sensor for cognitive engine are ideally selected.

The detector 20 is configured of a squaring circuit 21, two integration/attenuation units 23, 24, a code inverter 25, two adders 26, 27, and two determination devices 28, 29 as shown in FIG. 1.

In the detector 20, the squaring circuit 21, the integration/attenuation unit 23, the adder 26 and the determination device 28 are connected in series. The connection between the integration/attenuation unit 23 and the adder 26 is branched and the integration/attenuation unit 23 is connected also to the adder 27. The squaring unit 21, the integration/attenuation unit 24, the adder 27 and the determination device 29 are connected in series. The connection between the integration/attenuation unit 24 and the adder 27 is branched and the integration/attenuation unit 24 is connected to the adder 27 via the code inverter 25.

Specifically, at the corresponding part of the receiver chain 60 in the detector 20, at first, a frequency band signal for UWB is input into the squaring circuit 21, then an output value (energy value) from the squaring circuit 21 is input into the two integration/attenuation units 23, 24 in parallel to be multiplied in a predetermined integration interval, and the multiplied values are input into the adder 26. One integration value is input via the code inverter 25 before being input into the adder 26. Then, the output value is input from the adder 26 to the determination device 28. The adder 26 and the determination device 28 configure a sampling device and the sampling device samples $Z_{UWB}$ communication signals. Finally, information determined by the determination device 28 using a threshold is output.

In other words, the determination device 28 is a determination device for communication which outputs information based on the frequency band signals for UWB input via the antenna 11 and the bandpass filter $B_0$. The determination device 28 for communication is configured such that a determined statistic value is compared with a predetermined threshold to convert the determined statistic value into a binary signal and to output the binary signal. The information output from the determination device 28 for communication may be stored in the memory 50.

At the corresponding part of the spectrum sensor part 70 in the detector 20, a frequency band signal for spectrum sensing is input into the squaring circuit 21, then an output value (energy value) from the squaring circuit 21 is input into the two integration/attenuation units 23, 24 in parallel to be multiplied in a predetermined integration interval. Herein, since the integration interval is controlled by the controller 51, the integration interval is different between the transmission/reception mode and the spectrum sensing mode. The integration values of the integration/attenuation units 23 and 24 are input into the adder 27. Then, the adder 27 inputs its output value into the determination device 29. The adder 27 and the determination device 29 configure a sampling device and the sampling device samples $Z_{sens}$ sensing signals. Finally, the determination device 29 outputs information determined by use of a different threshold from that of the determination device 28.

In other words, the determination device 29 is a determination device for spectrum sensing which outputs information based on the frequency band signals for spectrum sensing input via the antenna 11 and the filter bank. The determination device 29 for spectrum sensing converts the determined statistic value into hard information for spectrum sensing and outputs the hard information. The determination device for spectrum sensing determines hard information by collecting energy values in each UWB symbol period or for some UWB symbols. The determination device 29 for spectrum sensing is configured to make a determination when a sufficient number of samples are collected. The information output from the determination device for spectrum sensing may be stored in the memory 50.

The memory 50 is an exemplary storage unit for storing information therein. The memory 50 stores sensing information or sensing control information obtained as a result of the spectrum sensing therein. The memory 50 stores therein the programs or control information used for the control by the controller 51.

The controller 51 is directed for conducting various controls in the spectrum sensor 1. For example, the controller 51 controls to switch the operation mode of the spectrum sensor 1 between the transmission/reception mode and the sensing mode. Thus, the controller 51 controls each bandpass filter. Specifically, it switches connection/disconnection between each bandpass filter and the detector 20.

The controller 51 is configured to be able to execute a plurality of tasks. The tasks executed by the controller 51 include control of integration intervals and control of delay intervals by the integration/attenuation units 23, 24 in the detector 20, and control of thresholds used by the determination devices 28, 29 in the detector 20 in addition to the control of each bandpass filter.

For the control of integration intervals, the controller 51 uses the integration interval selector shown in FIG. 1 to set an integration interval. The integration interval needed for communication (transmission/reception) is typically influenced by a channel delay diffusion $\tau_{rms}$ (the channel delay diffusion $\tau_{rms}$ is larger than 10 ns in indoor UWB applications, in many cases). On the other hand, an integration interval needed for sensing is mainly influenced by a target value of a detection probability. The controller 51 is configured to select (set) the integration interval according to one of the communication function and the spectrum sensing function. With the structure, the integration interval can be adjusted even when the operation mode changes, thereby accurately sharing the detector 20.

Specifically, when the selected function is the communication function (when the detected signal includes a primary signal), the controller 51 sets the integration interval $f_a$ for the integration/attenuation units 23, 24 according to the formula (1). Similarly, when the selected function is the spectrum sensing function (when the detected signal does not include a primary signal), the integration interval $f_a$ is set according to the formula (2).

$$f_a = T_{burst} + \tau_{rms} \qquad (1)$$

$$f_a = T_{GI} \qquad (2)$$

Figure 2:
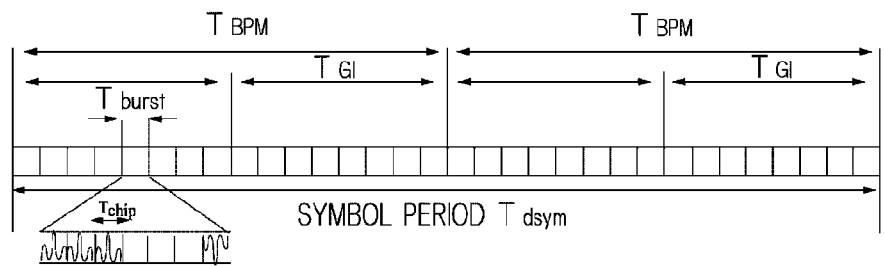
FIG. 2 is a diagram for explaining a time secured for sensing spectra by the spectrum sensor of FIG. 1.

$T_{burst}$ in the formula (1) corresponds to a period in which an interval $T_{BPM}$ obtained by dividing the UWB PHY symbol period $T_{dsym}$ into two is divided equally as shown in FIG. 2. $\tau_{rms}$ is arms delay diffusion of the UWB signal. $T_{GI}$ in the formula (2) indicates a guard interval period.

An actual integration interval needs to be dependent on the target value of the detection probability $P_D$ and a target value of an error alarm probability $P_{fa}$. In the present embodiment, therefore, integration is conducted in some UWB symbol periods.

For the control of delay intervals, the controller 51 determines the delay value of the integration start depending on whether the selected function is the communication function or the spectrum sensing function and by use of the parameters indicated in the formulas (3) to (6).

Specifically, when the selected function is the communication function (when the detected signal includes a primary signal), the controller 51 uses the delay selector shown in FIG. 1 to set the delay values $f_{b1}, f_{b2}$ for the integration/attenuation units 23, 24 according to the formulas (3), (4), respectively. Similarly, when the selected function is the spectrum sensing function (when the detected signal does not include a primary signal), the delay values $f_{b1}, f_{b2}$ are set according to the formulas (5), (6), respectively.

$$f_{b1} = kT_{sym} + D_k \qquad (3)$$

$$f_{b2} = KT_{sym} + T_{BPM} + D_k \qquad (4)$$

$$f_{b1} = kT_{sym} + T_{burst} \qquad (5)$$

$$f_{b2} = kT_{sym} + T_{BPM} + T_{burst} \qquad (6)$$

$f_{b1}$ and $f_{b2}$ indicate the delay select function of the first half of the symbol period and the delay select function of the latter half thereof, respectively, and are directed for calculating a proper integration interval based on the signal structure of the BPM-BPSK communication signal. k indicates an index of the symbol. $D_k$ is a time hopping code in changing from symbol to symbol.

For the control of thresholds, the controller 51 selects the thresholds (such as thresholds for noise) needed by the detector 20 and sets them for the determination devices 28, 29 depending on the operation mode or situation.

The spectrum sensor 1 is configured as described above in detail so that the spectrum sensor 1 can achieve the following properties and effects.

The spectrum sensor 1 is provided with the integrators (the integration/attenuation units 23, 24) arranged in parallel so that the two branches at the output sides of the respective integrators can be used to modulate or demodulate the BPM-BPSK signal specified in the PHY according to the IEEE802.15.4a. The integrators are used to collect the sample energy values for sensing spectra.

In the wireless communication system conforming to the IEEE802.15.4a, the symbol period is configured of the communication time and the guard interval period $T_{GI}$ (see FIG. 2). The guard interval period $T_{GI}$ does not include an effective communication signal. This is because the IEEE802.15.4a is designed for applications with a low data speed (data rate).

On the other hand, the spectrum sensor 1 according to the present embodiment operates while switching the operation mode by the controller 51 between the spectrum sensing mode and the communication mode during the symbol period. Specifically, the spectrum sensor 1 obtains a communication signal during the communication time determined by the standard, and obtains a sensing signal during a non-communication period. Thereby, the communication efficiency can be enhanced. More preferably, the guard interval period $T_{GI}$ defined as non-communication period by the standard is used to sense spectra, thereby obtaining a sensing signal. Typically, the guard interval period $T_{GI}$ is set to be sufficiently long, which is enough for sensing spectra. The spectrum sensor 1 according to the present invention is preferably configured such that even when the guard interval period $T_{GI}$ is set to be short, the controller 51 appropriately can switch the operation mode thereby to sense spectra.

The controller 51 can use the integration interval selector or delay selector to properly set an integration interval and a start point thereof for the integrator. The integration interval and the start point thereof are different between for spectrum sensing and for communication.

The controller 51 switches the operation mode during one symbol period. The controller 51 switches the operation mode only for the reception unit 10. The detector 20 in the spectrum sensor 1 performs the communication signal processing and the sensing signal processing in one symbol period. Consequently, the two devices 28, 29 output a communication signal and a sensing signal at the same time per symbol period, respectively. Thereby, the communication efficiency can be enhanced.

Specific examples (a first specific example and a second specific example) of the present invention will be described below.

In the first specific example, a plurality of spectrum sensors perform cooperative sensing and collaborative sensing to send the sensing results to the cognitive engine (CE) or an area capable of cognitive wireless communication.

Particularly, in indoor applications, communication is mainly made between spectrum sensors or between a spectrum sensor and a cognitive engine (CE), and thus the LR-WPAN having a low data rate (conforming to the IEEE802.15.4a standard) is suitable therefor. The LR-WPAN uses a UWB unlicensed frequency area. The reasons why the LR-WPAN is suitable are the following two. The first reason is that the spectrum sensor needs to make communication at a low data rate. The second reason is that it is a good option that the UWB unlicensed frequency band is used as a control channel.

The dual spectrum sensor according to the present invention is designed to be adaptable for BPM-BPSK as described above. In the first specific example, the spectrum sensor is distributed in the communicable area of the cognitive wireless communication system. Then, the spectrum sensor makes communication (transmission and reception) while performing the spectrum sensing, thereby making it possible minimize a latency required for supplying the sensing information on the spectrum sensing.

The spectrum sensor can perform any of multiple schemes of the spectrum sensing described later in the sensing period.

Figure 3:
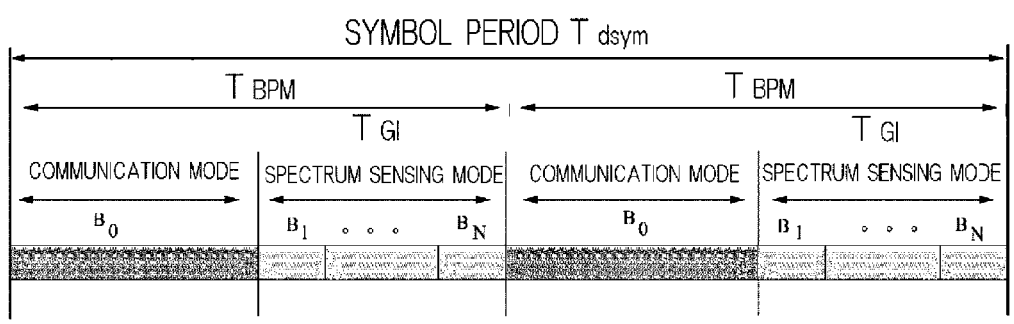
FIG. 3 is a diagram for explaining exemplary switching of operation modes of the spectrum sensor of FIG. 1.

One scheme is time bonding. In this case, spectrum sensing is performed between signal bursts. The spectrum sensing at this time is performed in parallel with the signal reception. When the data rate is low, the spectrum sensing can be sufficiently performed within the guard interval period $T_{GI}$ as shown in FIG. 3. The remaining time may be used for the communication.

Another scheme is continuous sensing. In this case, the spectrum sensing is performed between a burst of a communication packet and a vacant time. The continuous sensing can be executed while performing a synchronization processing or obtaining time information, for example. Still another scheme is scheduled sensing. The spectrum sensing in this case is scheduled to be cooperative with transmission and reception of a wireless signal such as control signal, and is executed while being scheduled to be associated with other peer's spectrum sensor.

In the second specific example, a plurality of cognitive wireless terminals perform cooperative sensing and collaborative sensing in the wireless communication system. When cooperation is requested based on an external wireless signal, the wireless communication terminals specify (one or multiple) cooperative frequency bands to request specific sensing information on the specific frequency band for the spectrum sensor.

In this case, the dual spectrum sensor conforms to the UWB PHY standard of the IEEE802.15.4a thereby to switch the front end of the cognitive radio according to the requested frequency band. Then, a digital signal processing is supportively performed on the downstream side (the back side) of the front end. In this way, the complexity of the wireless communication can be reduced remarkably also in the second specific example.

According to the embodiment and the specific examples, the spectrum sensor 1 can switch the operation mode between the spectrum sensing mode corresponding to the spectrum sensing function of sensing spectra and the communication mode corresponding to the communication function of transmitting and receiving data to and from other wireless communication device in the wireless communication system. Particularly, in the present embodiment, the operation mode can be switched during the symbol period of the ultra-wideband physical layer (UWB PHY) under control of the controller 51. Thus, the period of the spectrum sensing can effectively be used to receive information from other wireless communication device or transmit information thereto. Particularly, the spectrum sensor 1 can exercise the communication function even while processing the sensing signal. Thus, according to the present embodiment, a time required for the spectrum sensing function can be secured, and additionally a time required for the communication function can be secured, and consequently the communication efficiency of the cognitive wireless communication can be enhanced. The spectrum sensor 1 according to the present embodiment can demodulate the BPM-BPSK signaling in the impulse radio ultra-wideband.

According to the present embodiment, the spectrum sensor 1 can make communication by the receiver chain 60 and can sense spectra by the spectrum sensor part 70. The output values required for the final determination are obtained by sharing the components (particularly, the integration/attenuation units 23, 24) common between the receiver chain 60 and the spectrum sensor part 70 among the components of the detector 20. Thus, the spectrum sensor 1 according to the present embodiment has a low complexity and is small-sized. Further, overhead can be reduced and only a small amount of consumption power is required. In order to share the components, the integration interval selector and the delay selector are used to change the integration interval and the start point thereof in the present embodiment.

There has been mainly described above in the embodiment and the specific examples that the spectrum sensor 1 conforms to (or is compatible with) the IEEE802.15.4a standard. However, the spectrum sensor 1 according to the present embodiment can handle other LDC type signals. Further, the spectrum sensor 1 according to the present embodiment can handle any signal irrespective of signal type. The parameter values $f_a$, $f_{b1}$ and $f_{b2}$ are appropriately adjusted depending on the signal type or the like.

The spectrum sensor according to the above embodiment may be independently arranged in the wireless communication system, may be incorporated in the wireless communication device, or incorporated in the cognitive base station (CBS) or base station (BS) of the wireless communication system.

The spectrum sensor may be physically positioned outside the cognitive engine (CE) or incorporated in one device together with the cognitive engine (CE), and the dual spectrum sensor according to the present invention can be applied to both cases.

There have been described in the above embodiment the spectrum sensor 1 for cognitive wireless communication and the method for cognitive wireless communication using the spectrum sensor. However, the present invention includes not only the spectrum sensor and the wireless communication method but also the programs corresponding to the processings executed by the spectrum sensor and a recording medium recording the programs therein. Further, the present invention relates to wireless communication, and thus the present invention does not need to be used only in the cognitive wireless communication and the spectrum sensing for cognitive wireless communication, and may be applied to other wireless communication systems or other applications.

INDUSTRIAL APPLICABILITY

The present invention is well suitable for the field of wireless communication and the like.

DESCRIPTION OF REFERENCE SIGNS

1: Spectrum sensor
10: Reception unit
11, 12: Antenna
13: Group of filters
20: Detector
21: Squaring circuit
23, 24: Integration/attenuation unit
25: Code inverter
26, 27: Adder
28, 29: Determination device
50: Memory
51: Controller
60: Receiver chain
70: Spectrum sensor part

The invention claimed is:

1. A spectrum sensor for cognitive wireless communication which is provided in a cognitive wireless communication system comprising a wireless communication device capable of making cognitive wireless communication and is directed for sensing spectra in multiple frequency bands, comprising:
   a controller for controlling an operation mode to switch between a spectrum sensing mode in which the spectra are sensed and a communication mode in which communication is made with the wireless communication device during one symbol period of an ultra-wideband physical layer;
   a first integrator and a second integrator into which external wireless signals are input in parallel;
   a code inverter for inverting an output value of the second integrator;
   a first adder for adding an output value of the first integrator and the output value of the second integrator inverted by the code inverter;
   a first determination device connected to the first adder in series;
   a second adder for adding the output value of the first integrator and the output value of the second integration value not inverted by the code inverter; and
   a second determination device connected to the second adder in series,
   wherein the controller causes the first determination device to make a determination by use of the output value of the first adder when the operation mode is the communication mode, and causes the second determination device to make a determination by use of the output value of the second adder when the operation mode is the spectrum sensing mode.

2. The spectrum sensor for cognitive wireless communication according to claim 1, wherein the controller uses an integration interval selector and a delay selector to change an integration interval and a start point thereof of the integrator depending on the operation mode.

3. The spectrum sensor for cognitive wireless communication according to claim 1, comprising:
   a first antenna for receiving an external wireless signal;
   bandpass filters provided between the first antenna, and the first integrator and the second integrator;
   a group of antennas including second antennas for receiving external wireless signals; and
   a filter bank configured of a plurality of bandpass filters provided between the group of antennas, and the first integrator and the second integrator,
   wherein the controller switches the operation mode so that the external wireless signals are input into both the first integrator and the second integrator via the bandpass filters or the filter bank.

4. The spectrum sensor for cognitive wireless communication according to claim 1,
   wherein the symbol period includes a period in which communication is made and a period in which communication is not made, and
   the controller switches the operation mode to the spectrum sensing mode in the period in which communication is not made.

* * * * *